United States Patent
Park et al.

(10) Patent No.: US 12,525,607 B2
(45) Date of Patent: Jan. 13, 2026

(54) POSITIVE ELECTRODE ACTIVE MATERIAL AND LITHIUM SECONDARY BATTERY USING THE SAME

(71) Applicant: ECOPRO BM CO., LTD., Cheongju-si (KR)

(72) Inventors: Jung Bae Park, Cheongju-si (KR); Chae Won Moon, Cheongju-si (KR); Hyun Jong Yu, Cheongju-si (KR); Yu jin Son, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 561 days.

(21) Appl. No.: 18/147,475

(22) Filed: Dec. 28, 2022

(65) Prior Publication Data
US 2023/0216037 A1 Jul. 6, 2023

(30) Foreign Application Priority Data

Jan. 5, 2022 (KR) .......... 10-2022-0001507
Oct. 19, 2022 (KR) .......... 10-2022-0134683

(51) Int. Cl.
*H01B 1/08* (2006.01)
*H01M 4/36* (2006.01)
*H01M 4/505* (2010.01)
*H01M 4/525* (2010.01)
*H01M 4/02* (2006.01)

(52) U.S. Cl.
CPC .......... *H01M 4/366* (2013.01); *H01B 1/08* (2013.01); *H01M 4/505* (2013.01); *H01M 4/525* (2013.01); *H01M 2004/028* (2013.01)

(58) Field of Classification Search
CPC .......... H01B 1/00; H01B 1/08; H01M 4/366; H01M 4/505; H01M 4/525; C01G 53/00
See application file for complete search history.

(56) References Cited

U.S. PATENT DOCUMENTS

| | | | | |
|---|---|---|---|---|
| 10,522,823 | B2 * | 12/2019 | Kim | H01M 10/0525 |
| 11,527,752 | B2 * | 12/2022 | Wu | H01M 4/525 |
| 11,942,635 | B2 * | 3/2024 | Choi | H01M 4/366 |
| 2018/0233739 | A1 | 8/2018 | Park et al. | |

FOREIGN PATENT DOCUMENTS

| | | |
|---|---|---|
| CN | 102339984 A | 2/2012 |
| EP | 4215492 A1 * | 7/2023 |
| JP | 2010-050079 A | 3/2010 |
| JP | 2014-040363 A | 3/2014 |
| KR | 10-2018-0104838 A | 9/2018 |

OTHER PUBLICATIONS

Yang et al "Spherical lithium-rich layered Li1.13[Mn0.534Ni0.233Co0.233]0.87O2 with concentration-gradient outer layer as high-performance cathodes for lithium ion batteries", Journal of Power Sources 232 (2013) 338-347.*

Yang-Kook Sun et al., "Synthesis and Characterization of Li[(Ni0.8Co0.1Mn0.1)0.8(Ni0.5Mn0.5)0.2]O2 with the Microscale Core-Shell Structure as the Positive Electrode Material for Lithium Batteries", J. Am. Chem. Soc., 127(38), pp. 13411-13418, Aug. 31, 2005, American Chemical Society.

Youngjin Kim et al., "Cobalt-free, high-nickel layered oxide cathodes for lithium-ion batteries: Progress, challenges, and perspectives", Energy Storage Materials, 34, pp. 250-259, Oct. 1, 2020, Elsevier.

Hou Peiyu et al., "A novel core-concentration gradient-shelled LiNi0.5Co0.2Mn0.3O2 as high-performance cathode for lithium-ion batteries", RSC Advances, vol. 4, No. 31, pp. 15923-15929, Feb. 11, 2014, doi: 10.1039/C3RA47930G.

Zhang Shan et al., "Cobalt-free concentration-gradient Li[Ni0.9Mn0.1]O2 cathode material for lithium-ion batteries", Journal of Alloys and Compounds, vol. 885, Jun. 29, 2021, pp. 1-9, doi: 10.1016/j.jallcom.2021.161005.

Liu Yulong et al., "An Evaluation of a Systematic Series of Cobalt-Free Ni-Rich Core-Shell Materials as Positive Electrode Materials for Li-Ion Batteries", Journal of The Electrochemical Society, vol. 168, No. 9, 090555, total 10 pages, Sep. 29, 2021, The Electrochemical Society.

Shevtsov Andrey et al., "Protective Spinel Coating for Li1.17Ni0.17Mn0.50Co0.17O2 Cathode for Li-Ion Batteries through Single-Source Precursor Approach", Nanomaterials, vol. 10, No. 9, 1870, total 16 pages, Sep. 18, 2020, doi: 10.3390/nano10091870.

* cited by examiner

*Primary Examiner* — Mark Kopec
(74) *Attorney, Agent, or Firm* — Studebaker Brackett PLLC

(57) ABSTRACT

The present invention relates to a cobalt-free positive electrode active material having improved thermal stability and electrochemical properties, and a lithium secondary battery using the same.

16 Claims, No Drawings

POSITIVE ELECTRODE ACTIVE MATERIAL AND LITHIUM SECONDARY BATTERY USING THE SAME

CROSS-REFERENCE TO RELATED APPLICATION

This application claims priority to and the benefit of Korean Patent Application No. 10-2022-0001507, filed on Jan. 5, 2022, and Korean Patent Application No. 10-2022-0134683, filed on Oct. 19, 2022, disclosures of which are incorporated herein by reference in its entirety.

BACKGROUND

1. Field of the Invention

The present invention relates to a cobalt-free positive electrode active material having improved thermal stability and electrochemical properties, and a lithium secondary battery using the same.

2. Discussion of Related Art

Batteries store electrical power by using materials having an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging an organic electrolyte or a polymer electrolyte between the positive electrode and the negative electrode.

A representative material used as a positive electrode active material of a lithium secondary battery is a lithium composite oxide. The lithium composite oxide may be $LiCoO_2$, $LiMn_2O_4$, $LiNiO_2$, $LiMnO_2$, or an oxide in which Ni, Co, Mn or Al is complexed.

A commercialized lithium composite oxide such as nickel-cobalt-manganese (NCM) includes cobalt as an essential element in order to reconcile the electrochemical properties and stability, which are in a mutual trade-off relationship.

However, recently, along with the rapid growth of the lithium secondary battery market, as the cost of raw materials also increased with the rapid growth of the lithium secondary battery market, another problem of cost reduction arose. Particularly, positive electrode active materials account for the largest cost share in lithium secondary batteries, and among these materials, cobalt, which is an essential element, of a lithium composite oxide such as nickel-cobalt-manganese (NCM) is not only the most expensive metal, but also has relatively high instability in supply and demand, so the market demand for positive electrode active materials reduced in cost by adopting cobalt-free composition is increasing.

Meanwhile, even when the amount of cobalt is reduced by a small amount in the commercialized lithium composite oxide such as nickel-cobalt-manganese (NCM), since the resistance of a positive electrode active material increases, the electrochemical properties, such as a rate capability, of a lithium secondary battery using the positive electrode active material are inevitably deteriorated. In addition, as the content of cobalt is reduced in the lithium composite oxide, the stability of particles drastically deteriorates, and thus there is a possibility that the lifetime of the lithium secondary battery using the lithium composite oxide as a positive electrode active material is reduced early.

SUMMARY OF THE INVENTION

In the lithium secondary battery market, the growth of lithium secondary batteries for electric vehicles is driving the market, and accordingly, the demand for positive electrode active materials used in lithium secondary batteries is also continuously increasing.

For example, conventionally, to ensure stability, lithium secondary batteries using lithium iron phosphate (LFP) have mainly been used, but recently, the use of a nickel-based lithium composite oxide having a larger energy capacity per weight than LFP tends to be increasing.

In addition, recently, nickel-based lithium composite oxides mainly used as positive electrode active materials for high-capacity lithium secondary batteries essentially use three-component metal elements such as nickel, cobalt and manganese or nickel, cobalt and aluminum. However, since cobalt is not only unstable in supply, but also excessively expensive compared to other raw materials, a positive electrode active material with a new composition, which can reduce a cobalt content or exclude cobalt is needed.

Considering all these circumstances, cobalt-free lithium composite oxides excluding the use of cobalt in commercialized three-component lithium composite oxides with nickel-cobalt-manganese (NCM) or nickel-cobalt-aluminum (NCA) compositions are attracting attention.

The cobalt-free lithium composite oxides meet the above-described market expectations, but have limitations in that they lack electrochemical properties or stability to replace positive electrode active materials, for example, commercialized three-component lithium composite oxides with nickel-cobalt-manganese (NCM) or nickel-cobalt-aluminum (NCA) compositions.

For example, as described above, since the resistance of a positive electrode active material increases as the content of cobalt in commercialized three-component lithium composite oxide with nickel-cobalt-manganese (NCM) or nickel-cobalt-aluminum (NCA) compositions decreases, the decrease in electrochemical properties, such as rate characteristics, of a lithium secondary battery using the positive electrode active material is inevitable.

In addition, as the content of cobalt in the lithium composite oxide decreases, particle stability (crystal stability, thermal stability, particle strength, or the like) rapidly decreases, there is a problem that the lifetime of a lithium secondary battery using the lithium composite oxide as a positive electrode active material may deteriorate early.

However, compared with commercialized three-component lithium composite oxides with nickel-cobalt-manganese (NCM) or nickel-cobalt-aluminum (NCA) compositions, although the electrochemical properties and stability of conventional cobalt-free lithium composite oxides are somewhat low, it was confirmed by the inventors that the cobalt-free lithium composite oxide can exhibit electrochemical properties and stability at levels suitable for commercialization by newly designing the bulk structure and bulk composition of the cobalt-free lithium composite oxide.

Accordingly, the present invention is directed to providing a cobalt-free positive electrode active material having improved thermal stability and electrochemical properties by controlling the bulk structure and bulk composition and a lithium secondary battery using the same.

To solve the above-described technical problems, according to one aspect of the present invention, a positive electrode active material including a lithium composite oxide containing at least nickel and manganese is provided. Here, the lithium composite oxide has a structure comprising an inner bulk and an outer bulk surrounding the surface of the inner bulk.

In one embodiment, a Ni/Mn molar ratio of the outer bulk is preferably smaller than a Ni/Mn molar ratio of the inner bulk. Specifically, the Ni/Mn molar ratio of the inner bulk is greater than 4.26 and less than 9.00, and the Ni/Mn molar ratio of the outer bulk may be 1.0 or more and less than 2.33.

In one embodiment, a volume fraction occupied by the outer bulk among the total volume of the lithium composite oxide is preferably smaller than a volume fraction occupied by the inner bulk. More specifically, the volume fraction occupied by the outer bulk among the total volume of the lithium composite oxide may be 7.4% or more and less than 27.1%.

As described above, through the control of the bulk structure and bulk composition of the lithium composite oxide, the cobalt-free lithium composite oxide defined herein may exhibit electrochemical properties and stability at levels suitable for commercialization.

In one embodiment, through the control of the bulk structure and bulk composition of the lithium composite oxide, a cation mixing layer may be present at least a part of the surface of the outer bulk. Here, as a cation mixing ratio of the outer bulk is designed to be higher than that of the inner bulk, it is possible to prevent degradation of the overall electrochemical properties of the lithium composite oxide by increasing the crystal stability of the surface of the lithium composite oxide and lowering a cation mixing ratio of the inner bulk at the same time.

In one embodiment, the lithium composite oxide may be represented by Formula 1 below:

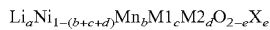

$Li_aNi_{1-(b+c+d)}Mn_bM1_cM2_dO_{2-e}X_e$      [Formula 1]

(Wherein

M1 and M2 are each independently at least one selected from Ti, Zr, Nb, Al, B, V, W, Ca, K, S, P, Sr, Ba, Mn, Ce, Hf, Ta, Cr, Mg, Fe, Zn, Si, Y, Ga, Sn, Mo, Ge, Nd, Gd, and Cu, M1 and M2 do not overlap each other, X is a halogen element present in a state of being substituted with oxygen present in the lithium composite oxide, $0.95 \le a \le 1.05$, $0 < b \le 0.5$, $0 \le c \le 0.05$, $0 \le d \le 0.05$, and $0 \le e \le 0.10$.)

In another embodiment, a coating layer including a metal oxide represented by Formula 2 below may be formed on at least a part of the surface of the lithium composite oxide:

$Li_jM3_gO_h$      [Formula 2]

(Wherein

M3 is at least one selected from Ni, Mn, Co, Ti, Zr, Nb, Al, B, V, W, Ca, K, S, P, Sr, Ba, Ce, Hf, Ta, Cr, Mg, Fe, Zn, Si, Y, Ga, Sn, Mo, Ge, Nd, Gd, and Cu, $0 \le f \le 10$, $0 \le g \le 8$, $2 \le h \le 13$, and the case where f and g are both 0 is excluded.)

The coating layer formed on at least a part of the surface of the lithium composite oxide may contribute to improving the electroconductivity of the outer bulk, which is relatively lower than that of the inner bulk.

In addition, according to another aspect of the present invention, a positive electrode including the above-described positive electrode active material is provided.

Moreover, according to still another aspect of the present invention, a lithium secondary battery using the above-described positive electrode is provided.

DETAILED DESCRIPTION OF EXEMPLARY EMBODIMENTS

In order to better understand the present invention, certain terms are defined herein for convenience. Unless defined otherwise herein, scientific and technical terms used herein will have meanings commonly understood by those of ordinary skill in the art. In addition, unless specifically indicated otherwise, terms in a singular form also include plural forms, and terms in a plural form should be understood to include singular forms as well.

Positive Electrode Active Material

According to one aspect of the present invention, a positive electrode active material including a lithium composite oxide containing at least nickel and manganese is provided.

The lithium composite oxide includes lithium in addition to nickel and manganese. Here, the lithium composite oxide is a composite metal oxide having a layered crystalline structure enabling intercalation/deintercalation of lithium ions.

The lithium composite oxide defined herein is a composite metal oxide distinct from overlithiated layered oxide (OLO) in which a phase belonging to the C2/m space group and a phase belonging to the R3-m space group are present in a solid-solution state as a ratio of manganese (e.g., 50 mol % or more) of all metal elements is relatively high relative to commercialized three-component lithium composite oxides.

The lithium composite oxide defined herein may be particles including at least one primary particle.

When the lithium composite oxide is present as a single primary particle, the lithium composite oxide may be referred to as a single particle. On the other hand, when the lithium composite oxide is present as an aggregate of a plurality of primary particles, the lithium composite oxide may be referred to as a secondary particle.

The positive electrode active material may include at least one selected from a lithium composite oxide present as a single particle and a lithium composite oxide present as a secondary particle in which a plurality of primary particles are aggregated.

Primary particles constituting the lithium composite oxide may have a rod shape, an elliptical shape, and/or an irregular shape. In addition, unless particularly intended in a manufacturing process, there are primary particles of various shapes in the same positive electrode active material.

The primary particles constituting the lithium composite oxide defined herein may have an average particle diameter of 0.1 to 5 μm, preferably 0.1 to 1.0 μm, and more preferably 0.25 to 0.75 μm. The average particle diameter of the primary particles may be calculated as an average value of the major axis length and the minor axis length of the primary particles.

When the average particle diameter of the primary particles is smaller than 0.1 μm, the specific surface area of the lithium composite oxide (secondary particle) consisting of the primary particles is relatively large. In this case, during storage or operation of the lithium secondary battery, the possibility of side reactions between the lithium composite oxide and an electrolyte may increase.

On the other hand, when the average particle diameter of the primary particles is larger than 5 μm, as the growth of the primary particles is excessively induced, the diffusion path of lithium ions in the primary particles also becomes longer. When the diffusion path of lithium ions in the primary particles is excessively long, the mobility of lithium ions in the primary particles and the diffusivity of lithium ions via the primary particles is reduced, causing an increase in resistance of the lithium composite oxide (secondary particle) consisting of the primary particles.

Accordingly, to reduce the specific surface area of the lithium composite oxide and prevent a decrease in the mobility of lithium ions in the primary particles and diffusivity of lithium ions between adjacent primary particles, the average particle diameter of the primary particles is preferably 0.1 to 5 μm, more preferably 0.1 to 1.0 μm, and even more preferably 0.25 to 0.75 μm.

When the lithium composite oxide is present as a secondary particle in which a plurality of primary particles are aggregated, the average particle diameter of the secondary particles may be 1 to 30 μm. The average particle diameter of the secondary particles may vary according to the number of primary particles.

A nickel content (mol %) calculated based on the all elements except lithium in the lithium composite oxide may be 50 mol % or more and less than 95 mol %, preferably, 60 mol % or more and 90 mol % or less, and more preferably, 75 mol % or more and 85 mol % or less.

When the nickel content in the lithium composite oxide is less than 50 mol %, the proportion of lithium composite oxide having a spinel crystalline structure in the positive electrode active material may increase. As the proportion of lithium composite oxide having a spinel crystalline structure in the positive electrode active material increases, since a higher operating voltage is required, the capacity characteristics of a lithium secondary battery using the lithium composite oxide as a positive electrode active material may be degraded. In addition, due to increasing the manganese content in the lithium composite oxide, cation mixing may increase as a whole in the lithium composite oxide.

Specifically, the charge of all transition metals constituting the lithium composite oxide prefers to have a trivalent state in order to exhibit a stable charge neutrality state. Here, when a lithium composite oxide having a small cobalt content and a large manganese content is synthesized, since $Mn^{4+}$ becomes excessive during the synthesis reaction, the content of $Ni^{2+}$ instead of $Ni^{3+}$ is increased to exhibit a charge neutral state. Since the $Ni^{2+}$ (0.69 Å) present in excess during the synthesis reaction has a size similar to $Li^+$ (0.76 Å), the 3a site of Li in the crystal structure of the lithium composite oxide may be occupied, this occupancy phenomenon is called cation mixing.

On the other hand, when nickel is excessive in the lithium composite oxide, the lithium composite oxide has the same characteristics as $LiNiO_2$. $LiNiO_2$ has problems of not only low thermal stability, but also self-degradation of a positive electrode active material when an internal short circuit occurs due to pressure from the outside in a charged state or the rupture and ignition of a lithium secondary battery due to side reactions at the interface and between surfaces of an electrolyte and the positive electrode active material.

Meanwhile, a manganese content (mol %) calculated based on all elements except lithium in the lithium composite oxide may be more than 5 mol % and 50 mol % or less, preferably, 10 mol % or more and 40 mol % or less, and more preferably, 10 mol % or more and 30 mol % or less.

To design the bulk composition for the lithium composite oxide to be free of cobalt, a manganese content of the lithium composite oxide is preferably more than at least 5 mol %.

On the other hand, when the manganese content in the lithium composite oxide is more than 50 mol %, the proportion of lithium composite oxide having a spinel crystalline structure in the positive electrode active material may increase. As described above, as the proportion of lithium composite oxide having a spinel crystalline structure in the positive electrode active material increases, since a high operating voltage is required, the capacity characteristics of a lithium secondary battery using the lithium composite oxide as a positive electrode active material may be degraded. In addition, as the manganese content in the lithium composite oxide decreases, cation mixing may increase as a whole in the lithium composite oxide.

The lithium composite oxide defined herein has a structure comprising an inner bulk and an outer bulk surrounding the surface of the inner bulk.

Here, the inner bulk and the outer bulk may be distinguished by an Ni/Mn molar ratio. For example, when a hydroxide precursor of the lithium composite oxide is synthesized using a co-precipitation method while continuously changing the concentrations of nickel and manganese present in a metal salt aqueous solution, a hydroxide precursor in which the concentrations of nickel and manganese continuously change from the center to the surface may be obtained.

However, as described above, when the concentrations of nickel and manganese continuously change from the center to surface of the hydroxide precursor, since an Ni/Mn molar ratio also continuously changes from the center to the surface of the hydroxide precursor, an inner bulk and an outer bulk may not be distinguished based on the Ni/Mn molar ratio.

On the other hand, for example, when the inner bulk is synthesized using a first metal salt aqueous solution in which a molar ratio of nickel and manganese is designed to be 85:15 and then the outer bulk is synthesized using a second metal salt aqueous solution in which a molar ratio of nickel and manganese is designed to be 50:50, the Ni/Mn molar ratio of the inner bulk and the Ni/Mn molar ratio of the outer bulk depend on the Ni/Mn molar ratios of the first metal salt aqueous solution and the second metal salt aqueous solution. Accordingly, the inner bulk and the outer bulk may be distinguished based on the Ni/Mn molar ratios.

The concentration of a transition metal in the lithium composite oxide may be measured by various known methods. For example, after cross-sectioning the lithium composite oxide and EDS mapping, the change in concentration of a target transition metal may be measured by line scanning.

In addition, there is energy profiling-energy dispersive X-ray spectroscopy (EP-EDS) for measuring the concentration of a target transition metal to a depth that an electron beam irradiated on the surface of the lithium composite oxide penetrates according to the intensity of an acceleration voltage ($V_{acc}$).

In one embodiment, the Ni/Mn molar ratio of the outer bulk is preferably smaller than that of the inner bulk. When the Ni/Mn molar ratio of the outer bulk is designed to be smaller than that of the inner bulk, the Mn content in the outer bulk is larger than that of the inner bulk.

As the Mn content is reduced and the Ni content is increased in the inner bulk, cation mixing in the inner bulk is reduced, and thus improvements in capacity and rate capability may be expected.

In addition, as the Mn content in the outer bulk increases, cation mixing present in the lithium composite oxide may be localized in the outer bulk, for example, the surface of the lithium composite oxide.

That is, as the cation mixing ratio and the manganese content have a proportional relationship only for the lithium composite oxide defined herein, the cation mixing ratio of the outer bulk may be higher than that of the inner bulk.

When the cation mixing is localized on the surface of the lithium composite oxide, a cation mixing layer may be present at least a part of the surface of the lithium composite oxide.

Unlike cation mixing present in the inner bulk, cation mixing present in the outer bulk may contribute to an improvement in stability (crystal stability, thermal stability, or particle strength) of the lithium composite oxide by improving the surface stability of the lithium composite oxide.

At least one phase selected from a layered structure, a rock salt structure and a spinel structure may be present in the cation mixing layer. Here, the layered structure present in the cation mixing layer may be different from the layered structures present in at least the inner bulk and the outer bulk.

Specifically, to reduce cation mixing in the inner bulk and induce improvements in capacity and rate capability from the inner bulk, a molar ratio of Ni to all metal elements except lithium of the inner bulk may be 0.7 or more and less than 1.0, and the Ni/Mn molar ratio of the inner bulk may be greater than 4.26 and less than 9.00, and preferably, 4.56 or more and 7.33 or less.

When the Ni/Mn molar ratio of the inner bulk is 4.26 or less, since the Mn content in the inner bulk becomes excessively large, cation mixing in the inner bulk may be increased. On the other hand, when the Ni/Mn molar ratio of the inner bulk is 9.00 or more, since the Ni content in the inner bulk becomes excessively large, the thermal stability of the inner bulk may be reduced.

In addition, to improve the surface stability and overall electrochemical properties of the lithium composite oxide by concentrating cation mixing present in the lithium composite oxide on the surface of the lithium composite oxide, a molar ratio of Ni to all metal elements except lithium of the outer bulk may be designed to be 0.5 or more and less than 0.8, and a Ni/Mn molar ratio of the outer bulk may be designed to be 1.0 or more and less than 2.33, and preferably 1.0 or more and 1.5 or less.

When the Ni/Mn molar ratio of the outer bulk is less than 1.0, there is a risk that undesirable phase transition may occur in the outer bulk due to excessive Mn content in the outer bulk. On the other hand, when the Ni/Mn molar ratio of the outer bulk is 2.33 or more, cation mixing present in the lithium composite oxide may be evenly dispersed in the inner bulk and the outer bulk instead of being localized in the outer bulk.

In addition, as described above, to design cation mixing present in the lithium composite oxide to be localized in the outer bulk, a ratio of the Ni content (mol %) of the outer bulk with respect to the Ni content (mol %) of the inner bulk may be more than 0.556 and less than 0.740, and preferably 0.588 or more and 0.732 or less, and a ratio of the Mn content (mol %) of the outer bulk with respect to the Mn content (mol %) of the inner bulk may be designed to be 2.2 or more and less than 5.0, and preferably 2.2 or more and 3.75 or less.

Meanwhile, to exhibit electrochemical properties and stability of the cobalt-free lithium composite oxide at levels suitable for commercialization, it is necessary to design the Ni/Mn molar ratios of the inner bulk and the outer bulk within the above-defined ranges and also to control volume fractions of the inner bulk and the outer bulk.

In one embodiment, the volume fraction occupied by the outer bulk among the total volume of the lithium composite oxide is preferably smaller than the volume fraction occupied by the inner bulk.

As the volume fraction of the outer bulk is designed to be smaller than that of the inner bulk, the outer bulk having cation mixing may be localized on the surface of the lithium composite oxide by reducing a ratio of the region in which cation mixing is present among the total volume of the lithium composite oxide, resulting in simultaneously improving the surface stability and electrochemical properties of the lithium composite oxide.

Specifically, the volume fraction occupied by outer bulk among the total volume of the lithium composite oxide may be designed to be 7.4% or more and less than 27.1%, and preferably 8.7% or more and 24.7% or less.

When the volume fraction of the outer bulk is less than 7.4%, since the volume occupied by the outer bulk among the total volume of the lithium composite oxide is small, it may be difficult to effectively concentrate cation mixing present in the lithium composite oxide in the outer bulk. On the other hand, when the volume fraction of the outer bulk is 27.1% or more, since the volume occupied by the outer bulk having cation mixing in the lithium composite oxide becomes excessively large, electrochemical properties including the capacity and rate capability of the lithium composite oxide may be degraded.

The volume fraction of the inner bulk among the total volume of the lithium composite oxide may be calculated using a ratio of the radius of the inner bulk to the radius of the lithium composite oxide. Specifically, the volume fraction of the inner bulk among the total volume of the lithium composite oxide may be represented by a ratio of the volume calculated using the radius of the inner bulk to the total volume of the lithium composite oxide calculated using the radius of the lithium composite oxide ([volume of the inner bulk/total volume of the lithium composite oxide]*100).

In addition, the volume fraction occupied by the outer bulk among the total volume of the lithium composite oxide may be calculated using a ratio of the thickness of the outer bulk to the radius of the lithium composite oxide. Specifically, the volume fraction of the outer bulk among the total volume of the lithium composite oxide may be represented by the ratio of the difference in volume calculated using the total volume of the lithium composite oxide and the radius of the inner bulk with respect to the total volume of the lithium composite oxide calculated using the radius of the lithium composite oxide ([total volume of the lithium composite oxide−volume of the inner bulk/total volume of the lithium composite oxide]*100).

To satisfy the above-described definition of the volume fraction occupied by the outer bulk among the total volume of the lithium composite oxide, a ratio of the thickness of the outer bulk to the radius of the lithium composite oxide may be designed to be more than 0.025 and less than 0.10, and preferably 0.030 or more and 0.090 or less.

When the ratio of the thickness of the outer bulk to the radius of the lithium composite oxide is 0.025 or less, the volume occupied by the outer bulk among the total volume of the lithium composite oxide may become excessively small. On the other hand, when the ratio of the thickness of the outer bulk to the radius of the lithium composite oxide is 0.10 or more, since the volume occupied by the outer bulk having cation mixing in the lithium composite oxide becomes excessively large, electrochemical properties including the capacity and rate capability of the lithium composite oxide may be degraded.

In one embodiment, the lithium composite oxide may be cobalt-free lithium composite oxide represented by Formula 1 below. The composition represented by Formula 1 below represents the average composition for the inner bulk and outer bulk:

$$Li_aNi_{1-(b+c+d)}Mn_bM1_cM2_dO_{2-e}X_e \quad \text{[Formula 1]}$$

(Wherein

M1 and M2 are each independently at least one selected from Ti, Zr, Nb, Al, B, V, W, Ca, K, S, P, Sr, Ba, Mn, Ce, Hf, Ta, Cr, Mg, Fe, Zn, Si, Y, Ga, Sn, Mo, Ge, Nd, Gd, and Cu, M1 and M2 do not overlap each other, X is a halogen element present in a state of being substituted with oxygen present in the lithium composite oxide, $0.95 \leq a \leq 1.05$, $0 < b \leq 0.5$, $0 \leq c \leq 0.05$, $0 \leq d \leq 0.05$, and $0 \leq e \leq 0.10$.)

In Formula 1, "1−(b+c+d)" representing the nickel content (molar ratio) in the lithium composite oxide may be 0.5 or more and less than 0.95, preferably 0.6 or more and 0.9 or less, and more preferably, 0.75 or more and 0.85 or less.

In addition, in Formula 1, "b" representing the manganese content (molar ratio) in the lithium composite oxide may be more than 0 and 0.50 or less, preferably more than 0.05 and 0.5 or less, more preferably, 0.10 or more and 0.40 or less, and even more preferably, 0.10 or more and 0.30 or less.

Meanwhile, by designing the Ni/Mn molar ratio of the outer bulk to be smaller than that of the inner bulk, electrochemical properties including the capacity and rate capability expected from the inner bulk are improved, and by concentrating cation mixing in the outer bulk, the surface stability of the lithium composite oxide may be improved. However, when cation mixing is concentrated in the outer bulk, the charge-transfer and/or diffusivity (i.e., surface kinetics) of lithium ions at the surface of the lithium composite oxide may be degraded due to the degradation of the electroconductivity of the surface of the lithium composite oxide.

Accordingly, when a coating layer including a metal oxide represented by Formula 2 below formed on at least a part (i.g., at least a part of the surface of the outer bulk) of the lithium composite oxide is formed, the electroconductivity of the outer bulk, which is relatively lower than that of the inner bulk, may be improved, and may also contribute to improvement of the surface kinetics of the lithium composite oxide:

$$Li_fM3_gO_h \quad \text{[Formula 2]}$$

(Wherein

M3 is at least one selected from Ni, Mn, Co, Ti, Zr, Nb, Al, B, V, W, Ca, K, S, P, Sr, Ba, Ce, Hf, Ta, Cr, Mg, Fe, Zn, Si, Y, Ga, Sn, Mo, Ge, Nd, Gd, and Cu, $0 \leq f \leq 10$, $0 \leq g \leq 8$, $2 \leq h \leq 13$, and the case where f and g are both 0 is excluded.)

Non-limiting examples of the metal oxide represented by Formula 2 include $Li_gZr_hO_i$, $Li_gTi_hO_i$, $Li_gNi_hO_i$, $Li_gNb_hO_i$, $Li_gCO_hO_i$, $Li_gSi_hO_i$, $Li_gAl_hO_i$, $Co_hO_i$, $Mn_hO_i$, $Al_hO_i$, $Si_hO_i$, $Zr_hO_i$, and $Ti_hO_i$. In addition, a heterogeneous metal oxide represented by Formula 2 may be independently present on at least a part of the surface of the lithium composite oxide.

The surface where adjacent primary particles in the secondary particle come into contact with each other may be referred to as the interface between primary particles, and the interface between the primary particles may be defined as a grain boundary between the primary particles. In addition, the primary particle may be spaced apart from a neighboring primary particle to form a pore in the secondary particle.

The surface of the secondary particle formed by aggregating a plurality of primary particles corresponds to an exposed surface of the primary particle present on the surface of the secondary particle.

The coating layer is defined as an area in which there is the metal oxide on the surface of the primary particle and/or the secondary particle, and the coating layer may be entirely or partially formed on the surface of the primary particle and/or the secondary particle. When the coating layer is partially formed on the surface of the primary particle and/or the secondary particle, the shape of the coating layer may be referred to as an island shape.

In addition, the metal oxide may be present in a physically and/or chemically bonded state on the surface of the primary particle and/or the secondary particle, or present in a partially solid-solution state.

The coating layer present in the secondary particle may be formed as the metal oxide is diffused from the surface of the secondary particle to the center of the secondary particle along the grain boundary between the primary particles. As the metal oxide is diffused from the surface of the secondary particle to the center of the secondary particle, at least one (e.g., M3) of the elements included in the metal oxide may exhibit a concentration gradient that decreases from the surface of the secondary particle to the center of the secondary particle.

The gradient of the metal oxide may be measured by scanning the concentration change of an element specific for the metal oxide after EDS mapping after cross-sectioning the lithium composite oxide, or by energy profiling-energy dispersive X-ray spectroscopy (EP-EDS) for measuring the concentration of an element specific for the metal oxide according to a depth that an electron beam irradiated on the surface of the lithium composite oxide penetrates.

Lithium Secondary Battery

Another aspect of the present invention may provide a positive electrode including a positive electrode current collector and a positive electrode active material layer formed on the positive electrode current collector. Here, the positive electrode active material layer may include positive electrode active materials according to various embodiments of the present invention. Therefore, since the positive electrode active material is the same as described above, detailed description thereof will be omitted for convenience, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included optionally as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by coating the positive electrode current collector with a positive electrode slurry composition prepared by dissolving or dispersing the positive electrode active material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator film and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator film, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material, and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flaketype, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

In addition, in another exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator film is not particularly limited as long as it is generally used in a lithium secondary battery to separate a negative electrode from a positive electrode and provide a diffusion path for lithium ions, and particularly, the separator film has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator film including a ceramic component or a polymer material may be used to ensure thermal resistance or mechanical strength, and may be optionally used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

When the electrolyte used herein is a solid electrolyte, for example, a solid inorganic electrolyte such as a sulfide-based solid electrolyte, an oxide-based solid electrolyte, a nitride-based solid electrolyte, or a halide-based solid electrolyte may be used, and preferably, a sulfide-based solid electrolyte is used.

As a material for a sulfide-based solid electrolyte, a solid electrolyte containing Li, an X element (Wherein X is at least one selected from P, As, Sb, Si, Ge, Sn, B, Al, Ga and In) and S may be used. Examples of the sulfide-based solid electrolyte material may include $Li_2S$—$P_2S_5$, $Li_2S$—$P_2S$—LiX (Wherein X is a halogen element such as I or Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (Wherein m and n are integers, and Z is Ge, Zn or Ga), $Li_2S$—$GeS_2$, $Li_2S$—$SiS_2$—$Li_3PO_4$, and $Li_2S$—$SiS_2$—$Li_pMO_q$ (Wherein p and q are integers, and M is P, Si, Ge, B, Al, Ga or In).

A solid electrolyte, and preferably, a sulfide-based solid electrolyte may be amorphous, crystalline, or a state in which an amorphous phase and crystalline phase are mixed.

Materials for an oxide-based solid electrolyte include $Li_7La_3Zr_2O_{12}$, $Li_{7-x}La_3Zr_{1-x}Nb_xO_{12}$, $Li_{7-3x}La_3Zr_2Al_xO_{12}$, $Li_{3x}La_{2/3-x}TiO_3$, $Li_{1+x}Al_xTi_{2-x}(PO_4)_3$, $Li_{1+x}Al_xGe_{2-x}(PO_4)_3$, $Li_3PO_4$, $Li_{3+x}PO_{4-x}N_x$ (LiPON), and $Li_{2+2x}Zn_{1-x}GeO_4$ (LISICON).

The above-described solid electrolyte may be disposed as a separate layer (solid electrolyte layer) between a positive electrode and a negative electrode. In addition, the solid electrolyte may be partially included in a positive electrode active material layer of the positive electrode independent of the solid electrolyte layer, or the solid electrolyte may be partially included in a negative electrode active material of the negative electrode independent of the solid electrolyte layer.

To enhance lifetime characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle (HEV), a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Preparation Example 1. Preparation of Positive Electrode Active Material

Example 1

(a) A hydroxide precursor partitioned into an inner bulk and an outer bulk surrounding the surface of the inner bulk was synthesized through a co-precipitation method.

First, after a first metal salt aqueous solution prepared by mixing nickel sulfate and manganese sulfate weighed so as to have an Ni:Mn molar ratio of 83:17 was put into a reactor and reacted for 1,437 minutes while stirring at 450 rpm, an inner bulk, which has the average composition of $Ni_{0.83}Mn_{0.17}(OH)_2$ and a radius of 4.850 μm, was formed. The volume of the inner bulk calculated using the radius of the inner bulk was 477.6 μm³.

(b) After the completion of the synthesis of the inner bulk, a second metal salt aqueous solution prepared by mixing nickel sulfate and manganese sulfate weighed to have a Ni:Mn molar ratio of 50:50 was put into a reactor and reacted for 153 minutes while stirring at 450 rpm, thereby forming an outer bulk having the average composition of $Ni_{0.50}Mn_{0.50}(OH)_2$ and a thickness of 0.150 μm on the surface of the inner bulk. The volume of the outer bulk calculated using the thickness of the outer bulk was 45.7 μm³.

Here, the average composition for the hydroxide precursor including the finally synthesized inner and outer bulks was $Ni_{0.80}Mn_{0.20}(OH)_2$, and the radius of the precursor was 5.0 μm.

(c) After mixing the hydroxide precursor obtained in (b) and LiOH (weighed so that Li has a molar ratio of 1.02 with respect to the content of all metal elements based on the final product), the temperature was raised to 820° C. at 2° C. per minute while maintaining an O2 atmosphere in a calcining furnace, and the resulting mixture was thermally treated at 820° C. for 8 hours, thereby obtaining a lithium composite oxide having a radius of 5.0 μm.

Examples 2 to 8

Positive electrode active materials according to Examples 2 to 8 were prepared in the same manner as in Example 1, except for conditions listed in Tables 1 and 2 below.

TABLE 1

| Classification | Example 1 | Example 2 | Example 3 | Example 4 |
|---|---|---|---|---|
| Ni:Mn mixing ratio of first metal salt aqueous solution | 83:17 | 85:15 | 82:18 | 84:16 |
| Reaction time (min) of first metal salt aqueous solution | 1,437 | 1,326 | 1,433 | 1,417 |
| Radius (μm) of inner bulk | 4.850 | 4.750 | 4.850 | 4.750 |
| Volume (μm³) of inner bulk | 477.6 | 448.7 | 477.6 | 448.7 |

TABLE 1-continued

| Classification | Example 1 | Example 2 | Example 3 | Example 4 |
|---|---|---|---|---|
| Ni:Mn mixing ratio of second metal salt aqueous solution | 50:50 | 50:50 | 55:45 | 55:45 |
| Reaction time (min) of second metal salt aqueous solution | 153 | 246 | 69 | 81 |
| Radius (μm) of outer bulk | 0.150 | 0.250 | 0.150 | 0.250 |
| Volume (μm$^3$) of outer bulk | 45.7 | 74.6 | 45.7 | 74.6 |
| Ni:Mn mixing ratio of hydroxide precursor | 80:20 | 80:20 | 80:20 | 80:20 |
| Radius (μm) of hydroxide precursor | 5.0 | 5.0 | 5.0 | 5.0 |

TABLE 2

| Classification | Example 5 | Example 6 | Example 7 | Example 8 |
|---|---|---|---|---|
| Ni:Mn mixing ratio of first metal salt aqueous solution | 88:12 | 82:18 | 83:17 | 87:13 |
| Reaction time (min) of first metal salt aqueous solution | 1,017 | 1,477 | 1,344 | 1,198 |
| Radius (μm) of inner bulk | 4.550 | 4.850 | 4.750 | 4.550 |
| Volume (μm$^3$) of inner bulk | 394.4 | 477.6 | 448.7 | 394.4 |
| Ni:Mn mixing ratio of second metal salt aqueous solution | 55:45 | 60:40 | 60:40 | 60:40 |
| Reaction time (min) of second metal salt aqueous solution | 93 | 61 | 73 | 88 |
| Radius (μm) of outer bulk | 0.450 | 0.150 | 0.250 | 0.450 |
| Volume (μm$^3$) of outer bulk | 129.0 | 45.7 | 74.6 | 129.0 |
| Ni:Mn mixing ratio of hydroxide precursor | 80:20 | 80:20 | 80:20 | 80:20 |
| Radius (μm) of hydroxide precursor | 5.0 | 5.0 | 5.0 | 5.0 |

Example 9

After mixing the lithium composite oxide obtained in (c) of Example 1, TiO$_2$ and ZrO$_2$, the temperature was raised to 720° C. at 2° C. per minute while maintaining an O$_2$ atmosphere in a calcining furnace, and the resulting mixture was thermally treated at 720° C. for 8 hours. TiO$_2$ and ZrO$_2$ were weighed so that each of the Ti and Zr contents became 0.1 mol % based on the metal elements except Li in the lithium composite oxide, and then mixed with the lithium composite oxide.

Through the thermal treatment, remaining Li present on the surface of the lithium composite oxide reacted with Ti and Zr, thereby obtaining a final product having the surface coated with an oxide including Ti and Zr.

Comparative Example 1

(a) A metal salt aqueous solution prepared by mixing nickel sulfate and manganese sulfate weighed so as to have an Ni:Mn molar ratio of 80:20 was put into a reactor and reacted for 1,493 minutes while stirring at 450 rpm, thereby forming a hydroxide precursor which has the average composition of Ni$_{0.80}$Mn$_{0.20}$(OH)$_2$ and a radius of 5.0 μm. The volume of the hydroxide precursor calculated using the radius of the hydroxide precursor was 523.3 μm$^3$.

(b) After mixing the hydroxide precursor obtained in (a) and LiOH (weighed so that Li has a molar ratio of 1.02 with respect to the content of all metal elements based on the final product), the temperature was raised to 820° C. at 2° C. per minute while maintaining an O$_2$ atmosphere in a calcining furnace, and the resulting mixture was thermally treated at 820° C. for 8 hours, thereby obtaining a lithium composite oxide having a radius of 5.0 μm.

Comparative Examples 2 to 8

Positive electrode active materials according to Comparative Examples 2 to 8 were prepared in the same manner as in Example 1, except for conditions listed in Tables 3 and 4 below.

TABLE 3

| Classification | Comparative Example 1 | Comparative Example 2 | Comparative Example 3 | Comparative Example 4 |
|---|---|---|---|---|
| Ni:Mn mixing ratio of first metal salt aqueous solution | 80:20 | 82:18 | 90:10 | 81:19 |
| Reaction time (min) of first metal salt aqueous solution | 1,493 | 1,443 | 802 | 1,473 |
| Radius (μm) of inner bulk | 5.000 | 4.875 | 4.500 | 4.875 |
| Volume (μm$^3$) of inner bulk | 523.3 | 485.1 | 381.5 | 485.1 |
| Ni:Mn mixing ratio of second metal salt aqueous solution | — | 50:50 | 50:50 | 60:40 |
| Reaction time (min) of second metal salt aqueous solution | — | 131 | 298 | 81 |
| Radius (μm) of outer bulk | — | 0.125 | 0.500 | 0.125 |
| Volume (μm$^3$) of outer bulk | — | 38.3 | 141.8 | 38.3 |
| Ni:Mn mixing ratio of hydroxide precursor | 80:20 | 80:20 | 79:21 | 79:21 |
| Radius (μm) of hydroxide precursor | 5.0 | 5.0 | 5.0 | 5.0 |

TABLE 4

| Classification | Comparative Example 5 | Comparative Example 6 | Comparative Example 7 | Comparative Example 8 |
|---|---|---|---|---|
| Ni:Mn mixing ratio of first metal salt | 88:12 | 81:19 | 82:18 | 84:16 |

TABLE 4-continued

| Classification | Comparative Example 5 | Comparative Example 6 | Comparative Example 7 | Comparative Example 8 |
|---|---|---|---|---|
| aqueous solution | | | | |
| Reaction time (min) of first metal salt aqueous solution | 987 | 1,466 | 1,439 | 1,433 |
| Radius (μm) of inner bulk | 4.500 | 4.875 | 4.750 | 4.500 |
| Volume (μm³) of inner bulk | 381.5 | 485.1 | 448.7 | 381.5 |
| Ni:Mn mixing ratio of second metal salt aqueous solution | 60:40 | 70:30 | 70:30 | 70:30 |
| Reaction time (min) of second metal salt aqueous solution | 88 | 76 | 79 | 78 |
| Radius (μm) of outer bulk | 0.500 | 0.125 | 0.250 | 0.500 |
| Volume (μm³) of outer bulk | 141.8 | 38.3 | 74.6 | 141.8 |
| Ni:Mn mixing ratio of hydroxide precursor | 80:20 | 80:20 | 80:20 | 80:20 |
| Radius (μm) of hydroxide precursor | 5.0 | 5.0 | 5.0 | 5.0 |

Comparative Example 9

After mixing the hydroxide precursor obtained in (b) in Comparative Example 1, $TiO_2$ and $ZrO_2$, the temperature was raised to 720° C. at 2° C. per minute while maintaining an O2 atmosphere in a calcining furnace, and the resulting mixture was thermally treated at 720° C. for 8 hours. $TiO_2$ and $ZrO_2$ were weighed so that each of the Ti and Zr contents became 0.1 mol % based on the metal elements except Li in the lithium composite oxide and then mixed with the lithium composite oxide.

Through the thermal treatment, remaining Li present on the surface of the lithium composite oxide reacted with Ti and Zr, thereby obtaining a final product having the surface coated with an oxide including Ti and Zr.

The Ni/Mn molar ratio (A) of the inner bulk, the Ni/Mn molar ratio (B) of the outer bulk, a ratio (C) of the Ni content (mol %) of the outer bulk with respect to the Ni content (mol %) of the inner bulk, a ratio (D) of the Mn content (mol %) of the outer bulk with respect to the Mn content (mol %) of the inner bulk, a ratio (E) of the thickness of the outer bulk to the radius of the lithium composite oxide, and the volume fraction (F) occupied by the outer bulk among the total volume of the lithium composite oxide, calculated from Tables 1 to 4, are shown in Table 5 below.

TABLE 5

| Classification | A | B | C | D | E | F |
|---|---|---|---|---|---|---|
| Example 1 | 4.88 | 1.00 | 0.602 | 2.941 | 0.030 | 8.73% |
| Example 2 | 5.67 | 1.00 | 0.588 | 3.333 | 0.050 | 14.26% |
| Example 3 | 4.56 | 1.22 | 0.671 | 2.500 | 0.030 | 8.73% |
| Example 4 | 5.25 | 1.22 | 0.655 | 2.813 | 0.050 | 14.26% |
| Example 5 | 7.33 | 1.22 | 0.625 | 3.750 | 0.090 | 24.64% |
| Example 6 | 4.56 | 1.50 | 0.732 | 2.222 | 0.030 | 8.73% |
| Example 7 | 4.88 | 1.50 | 0.723 | 2.353 | 0.050 | 14.26% |
| Example 8 | 6.69 | 1.50 | 0.690 | 3.077 | 0.090 | 24.64% |
| Example 9 | 4.88 | 1.00 | 0.602 | 2.941 | 0.030 | 8.73% |
| Comparative Example 1 | — | — | — | — | — | — |
| Comparative Example 2 | 4.56 | 1.00 | 0.610 | 2.778 | 0.025 | 7.31% |
| Comparative Example 3 | 9.00 | 1.00 | 0.556 | 5.000 | 0.100 | 27.10% |
| Comparative Example 4 | 4.26 | 1.50 | 0.741 | 2.105 | 0.025 | 7.31% |
| Comparative Example 5 | 7.33 | 1.50 | 0.682 | 3.333 | 0.100 | 27.10% |
| Comparative Example 6 | 4.26 | 2.33 | 0.864 | 1.579 | 0.025 | 7.31% |
| Comparative Example 7 | 4.56 | 2.33 | 0.854 | 1.667 | 0.050 | 14.26% |
| Comparative Example 8 | 5.25 | 2.33 | 0.833 | 1.875 | 0.100 | 27.10% |
| Comparative Example 9 | — | — | — | — | — | — |

Preparation Example 2. Manufacture of Lithium Secondary Batteries

A positive electrode slurry was prepared by dispersing 92 wt % of each of the positive electrode active materials prepared according to Preparation Example 1, 4 wt % of artificial graphite and 4 wt % of a PVDF binder in 30 g of N-methyl-2-pyrrolidone (NMP). The positive electrode slurry was uniformly applied to an aluminum (Al) thin film having a thickness of 15 μm and vacuum-dried at 135° C., thereby manufacturing a positive electrode for a lithium secondary battery.

A half-cell was manufactured using a lithium foil as a counter electrode for the positive electrode, a porous polyethylene film (Celgard 2300, thickness: 25 μm) as a separator, and an electrolyte in which $LiPF_6$ was present at a concentration of 1.15M in a solvent in which ethylene carbonate and ethyl methyl carbonate are mixed in a volume ratio of 3:7.

Experimental Example 1. Thermogravimetric Analysis of Positive Electrode Active Material Each lithium secondary battery (half-cell) manufactured according to Preparation Example 2 was charged up to 4.3V under a constant current condition of 0.1 C/0.1 C at 25° C. and then disassembled to recover the positive electrode active material.

Thermogravimetric analysis was performed on the recovered positive electrode active material to evaluate the thermal stability of the positive electrode active material.

The thermogravimetric analysis (TGA) was performed under the following conditions, and accordingly the on-set temperature at which the weight loss for the positive electrode active material begins to occur is shown in Table 6 below:

Sample: 65 mg of lithium composite oxide

Measurement atmosphere: Ar gas (gas flow rate: 60 ml/min)

Measurement condition: temperature increase from 30° C. to 350° C. at 10° C./min

TABLE 6

| Classification | On-set temperature (° C.) |
| --- | --- |
| Example 1 | 224.2 |
| Example 2 | 229.7 |
| Example 3 | 223.9 |
| Example 4 | 227.9 |
| Example 5 | 225.4 |
| Example 6 | 223.8 |
| Example 7 | 227.1 |
| Example 8 | 224.6 |
| Example 9 | 224.2 |
| Comparative Example 1 | 196.6 |
| Comparative Example 2 | 212.0 |
| Comparative Example 3 | 218.7 |
| Comparative Example 4 | 208.9 |
| Comparative Example 5 | 218.6 |
| Comparative Example 6 | 206.9 |
| Comparative Example 7 | 219.8 |
| Comparative Example 8 | 215.9 |
| Comparative Example 9 | 197.2 |

Referring to Table 6, it can be confirmed that the positive electrode active materials according to Examples 1 to 9 have improved thermal stability compared to those according to Comparative Examples 1 to 9. Particularly, it can be confirmed that the thermal stability of the positive electrode active materials according to Comparative Examples 1 and 9 is lower than those according to other Comparative Examples. When a positive electrode active material having lower thermal stability is used, it has the potential to reduce the lifetime of the lithium secondary battery as the positive electrode active material deteriorates early during the charging/discharging of the lithium secondary battery.

Experimental Example 2. Evaluation of Electrochemical Properties of Lithium Secondary Batteries Each lithium secondary battery (half-cell) manufactured in Preparation Example 2 was charged to 4.3V under 0.1 C/0.1 C constant current condition at 25° C. and discharged to 3.0V, thereby measuring an initial charge capacity, an initial discharge capacity and rate capability (C-rate).

Subsequently, the same lithium secondary battery was charged/discharged 50 times in an operating voltage range of 3.0V to 4.3V under 1 C/1 C condition at 45° C., and then the ratio of the discharge capacity at the $50^{th}$ cycle to the initial capacity (cycle capacity retention) was measured. The measurement results are shown in Table 7 below.

TABLE 7

| Classification Units | Initial charge capacity mAh/g | Initial discharge capacity mAh/g | Rate capability (5 C./0.1 C.) % | Cycle capacity retention rate % |
| --- | --- | --- | --- | --- |
| Example 1 | 216.6 | 187.6 | 81.7 | 97.6 |
| Example 2 | 217.9 | 190.7 | 83.1 | 98.3 |
| Example 3 | 216.4 | 187.3 | 81.9 | 97.4 |
| Example 4 | 216.8 | 189.2 | 82.4 | 97.7 |
| Example 5 | 216.2 | 188.6 | 82.6 | 97.3 |
| Example 6 | 216.1 | 187.2 | 81.8 | 97.2 |
| Example 7 | 217.2 | 189.1 | 82.3 | 97.5 |
| Example 8 | 217.1 | 187.9 | 82.1 | 97.4 |
| Example 9 | 217.4 | 187.6 | 83.5 | 98.0 |
| Comparative Example 1 | 214.8 | 187.8 | 80.9 | 96.2 |
| Comparative Example 2 | 212.4 | 184.8 | 78.9 | 96.9 |
| Comparative Example 3 | 215.4 | 187.3 | 80.8 | 97.3 |
| Comparative Example 4 | 213.1 | 184.2 | 79.1 | 96.5 |
| Comparative Example 5 | 214.2 | 187.1 | 81.1 | 96.8 |
| Comparative Example 6 | 212.9 | 184.5 | 79.5 | 96.1 |
| Comparative Example 7 | 215.2 | 185.6 | 80.8 | 96.9 |
| Comparative Example 8 | 214.9 | 184.9 | 81.2 | 96.2 |
| Comparative Example 9 | 214.7 | 187.7 | 81.5 | 96.4 |

Referring to Table 7, it can be confirmed that, within the operating voltage range of 3.0V to 4.3V, the lithium secondary batteries using the positive electrode active materials according to Examples 1 to 9 have overall improved initial charge capacities, initial discharge capacities, rate capabilities and cycle capacity retention rates, compared with the positive electrode active materials according to Comparative Examples 1 to 9.

In addition, compared with the results of the lithium secondary batteries using the positive electrode active materials according to Examples 1 and 9, it can be confirmed that rate capabilities are improved as a conductive coating layer is formed on the surface of the lithium composite oxide.

In addition, except for applying the operating voltage range of 3.0V to 4.5V, in order to evaluate the electrochemical properties of the lithium secondary batteries within the operating voltage range to which a relatively high upper limit voltage is applied, initial charge capacities, initial discharge capacities, rate capabilities and cycle capacity retention rates were measured in the same manner as described above.

The measurement results are shown in Table 8 below.

TABLE 8

| Classification Unit | Initial charge capacity mAh/g | Initial discharge capacity mAh/g | Rate capability (5 C./0.1 C.) % | Cycle capacity retention rate % |
| --- | --- | --- | --- | --- |
| Example 1 | 240.2 | 206.9 | 81.4 | 91.3 |
| Example 2 | 240.9 | 208.7 | 82.7 | 93.0 |
| Example 3 | 239.1 | 207.3 | 81.2 | 91.3 |
| Example 4 | 239.8 | 208.2 | 81.2 | 91.8 |
| Example 5 | 238.8 | 207.5 | 80.5 | 91.7 |
| Example 6 | 238.7 | 207.1 | 80.4 | 91.1 |
| Example 7 | 239.7 | 207.9 | 81.0 | 91.4 |
| Example 8 | 239.2 | 207.4 | 80.7 | 91.3 |
| Example 9 | 240.3 | 207.7 | 83.4 | 92.0 |
| Comparative Example 1 | 234.8 | 206.7 | 80.6 | 90.6 |
| Comparative Example 2 | 236.9 | 205.1 | 78.9 | 88.8 |
| Comparative Example 3 | 237.2 | 206.8 | 80.4 | 90.7 |
| Comparative Example 4 | 236.1 | 207.3 | 79.6 | 88.1 |
| Comparative Example 5 | 237.4 | 206.9 | 80.1 | 90.6 |
| Comparative Example 6 | 233.8 | 206.6 | 78.9 | 87.1 |
| Comparative Example 7 | 236.7 | 207.1 | 79.8 | 90.8 |

TABLE 8-continued

| Classification Unit | Initial charge capacity mAh/g | Initial discharge capacity mAh/g | Rate capability (5 C./0.1 C.) % | Cycle capacity retention rate % |
|---|---|---|---|---|
| Comparative Example 8 | 235.8 | 206.3 | 79.7 | 89.5 |
| Comparative Example 9 | 234.7 | 206.7 | 80.8 | 91.0 |

Referring to Table 8, it can be confirmed that, even in the driving voltage range to which a relatively high upper limit voltage (4.5V) is applied, the lithium secondary batteries using the positive electrode active materials according to Examples 1 to 9 have overall improved initial charge capacities, initial discharge capacities, rate capabilities and cycle capacity retention rates compared with the lithium secondary batteries using the positive electrode active materials according to Comparative Examples 1 to 9.

In addition, compared with the results of the lithium secondary batteries using the positive electrode active materials according to Examples 1 to 9, it can be confirmed that rate capabilities are improved as a conductive coating layer is formed on the surface of the lithium composite oxide.

What is claimed is:

1. A positive electrode active material comprising lithium composite oxide containing at least nickel and manganese, wherein the lithium composite oxide is partitioned into an inner bulk and an outer bulk that surrounds the surfaces of the inner bulk and has an Ni/Mn molar ratio of 1.0 or more and less than 2.33,
the Ni/Mn molar ratio of the outer bulk is smaller than the Ni/Mn molar ratio of the inner bulk, and
the volume fraction occupied by the outer bulk among the total volume of the lithium composite oxide is 7.4% or more and less than 27.1%.

2. The positive electrode active material of claim 1, wherein the Ni/Mn molar ratio of the outer bulk is 1.0 or more and 1.5 or less.

3. The positive electrode active material of claim 1, wherein the Ni/Mn molar ratio of the inner bulk is more than 4.26 and less than 9.00.

4. The positive electrode active material of claim 1, wherein a molar ratio of Ni to all metal elements except lithium in the inner bulk is 0.7 or more and less than 1.0.

5. The positive electrode active material of claim 1, wherein a molar ratio of Ni to all metal elements except lithium in the outer bulk is 0.5 or more and less than 0.8.

6. The positive electrode active material of claim 1, wherein a ratio of the thickness of the outer bulk with respect to the radius of the lithium composite oxide is more than 0.025 and less than 0.10.

7. The positive electrode active material of claim 1, wherein a ratio of the Ni content (mol %) of the outer bulk with respect to the Ni content (mol %) of the inner bulk is more than 0.556 and less than 0.740.

8. The positive electrode active material of claim 1, wherein a ratio of the Mn content (mol %) of the outer bulk with respect to the Mn content (mol %) of the inner bulk is 2.2 or more and less than 5.0.

9. The positive electrode active material of claim 1, wherein a cation mixing layer is present on at least a part of the surface of the outer bulk.

10. The positive electrode active material of claim 1, wherein a cation mixing ratio of the outer bulk is higher than a cation mixing ratio of the inner bulk.

11. The positive electrode active material of claim 1, wherein the lithium composite oxide is a cobalt-free lithium composite oxide.

12. The positive electrode active material of claim 1, wherein the lithium composite oxide is represented by Formula 1 below:

$$Li_aNi_{1-(b+c+d)}Mn_bM1_cM2_dO_{2-e}X_e \quad \text{[Formula 1]}$$

(Wherein
M1 and M2 are each independently at least one selected from Ti, Zr, Nb, Al, B, V, W, Ca, K, S, P, Sr, Ba, Mn, Ce, Hf, Ta, Cr, Mg, Fe, Zn, Si, Y, Ga, Sn, Mo, Ge, Nd, Gd, and Cu,
M1 and M2 do not overlap each other,
X is a halogen element present in a state of being substituted with oxygen present in the lithium composite oxide,
$0.95 \leq a \leq 1.05$, $0 < b \leq 0.5$, $0 \leq c \leq 0.05$, $0 \leq d \leq 0.05$, and $0 \leq e \leq 0.10$).

13. The positive electrode active material of claim 1, wherein a coating layer including a metal oxide represented by Formula 2 below is formed on at least a part of the surface of the lithium composite oxide:

$$Li_fM3_gO_h \quad \text{[Formula 2]}$$

(Wherein
M3 is at least one selected from Ni, Mn, Co, Ti, Zr, Nb, Al, B, V, W, Ca, K, S, P, Sr, Ba, Ce, Hf, Ta, Cr, Mg, Fe, Zn, Si, Y, Ga, Sn, Mo, Ge, Nd, Gd, and Cu,
$0 \leq f \leq 10$, $0 \leq g \leq 8$, $2 \leq h \leq 13$, and the case where f and g are both 0 is excluded).

14. The positive electrode active material of claim 13, wherein M3 comprises at least one selected from Ti and Zr.

15. A positive electrode comprising the positive electrode active material of claim 1.

16. A lithium secondary battery using the positive electrode of claim 15.

* * * * *